Nov. 12, 1957 — A. E. McFARLAND ET AL — 2,812,771
HYDRAULIC TESTING EQUIPMENT
Filed Aug. 31, 1953 — 2 Sheets-Sheet 1

Arthur E. McFarland
Artie F. McFarland
INVENTORS

BY Charles E. Lightfoot
ATTORNEY

Nov. 12, 1957  A. E. McFARLAND ET AL  2,812,771
HYDRAULIC TESTING EQUIPMENT
Filed Aug. 31, 1953  2 Sheets-Sheet 2

Arthur E. McFarland
Artie F. McFarland
INVENTORS

BY Charles E. Lightfoot
ATTORNEY 2,812,771
HYDRAULIC TESTING EQUIPMENT

Arthur E. McFarland and Artie F. McFarland, Houston, Tex.

Application August 31, 1953, Serial No. 377,274

3 Claims. (Cl. 137—114)

This invention relates to hydraulic testing equipment, and more particularly to equipment for pumping liquids and control mechanism therefor for use in the testing of apparatus or devices which are to be subjected to fluid pressures.

The invention finds particular application in connection with the testing of pipe lines and containers such as tanks, which may be subjected to high fluid pressures in use, and in which it is desirable to determine the pressures which such equipment is capable of withstanding, or the pressures which may safely be applied thereto.

In the testing of equipment of the kind referred to by the use of hydraulic fluid it is necessary to first substantially fill the apparatus or device with the fluid before pressure can be applied to the same and in the case of equipment of large capacity much time may be expended in merely filling the same prior to the actual testing period. Pumping equipment of large capacity may be used in substantially or nearly filling the apparatus or device to be tested, but when the same has been nearly filled, only a small additional amount of fluid is required to complete the filling operation and raise the pressure of the fluid to the desired degree, for which such large capacity pumping equipment is unsuitable, so that additional pumping equipment of small capacity capable of developing high fluid pressures is necessary, and means must be provided for shutting off the large capacity equipment and connecting in the high pressure equipment at the proper time in order to complete the testing operation.

The present invention has for an important object the provision of hydraulic testing equipment whereby the apparatus or device to be tested may be rapidly filled or nearly filled with hydraulic fluid and a small amount of fluid then applied thereto to complete the filling operation and raise the pressure of the fluid in the apparatus or device to the desired testing pressure.

Another object of the invention is to provide hydraulic testing equipment including pumping means of relatively large capacity and other pumping means of relatively small capacity and capable of delivering fluid at a relatively high pressure, and mechanism which is operable automatically when the pressure of fluid in the fluid delivery line of the equipment reaches a predetermined limit to shut off the flow of fluid from the large capacity pumping means through the delivery line and cause the small capacity pumping means to deliver fluid at high pressure to the delivery line.

A further object of the invention is the provision of hydraulic testing equipment embodying double acting pump mechanism and control means therefor whereby a large volume of hydraulic fluid may be supplied to the apparatus or device to be tested in order to quickly fill the same, and thereafter a relatively small additional volume of fluid may be supplied at high pressure to increase the pressure of fluid in the apparatus or device to be tested at the desired testing pressure.

Another object of the invention is to provide hydraulic testing equipment embodying high and low pressure fluid pumping mechanism and valve means operable upon a predetermined increase in the pressure of fluid delivered for causing the outflow of fluid from the low pressure mechanism to be by passed to the inflow thereof whereby the low pressure mechanism is rendered inactive, and for causing the high presusre mechanism to deliver fluid at high pressure to the apparatus or object to be tested.

A still further object of the invention is the provision of an improved double acting high and low pressure fluid pumping mechanism and an improved pressure fluid motor for operating the same.

Other important objects and advantages of the invention will best be understood from the following detailed description, constituting a specification of the same, when considered in conjunction with the annexed drawings, wherein—

Figure 3:
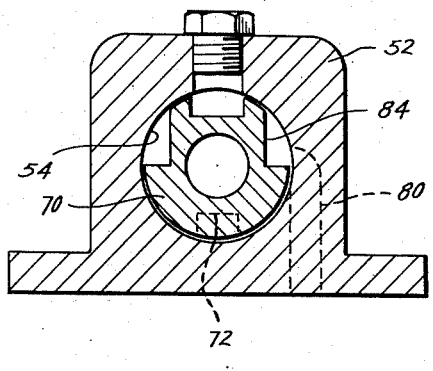
Figure 4:
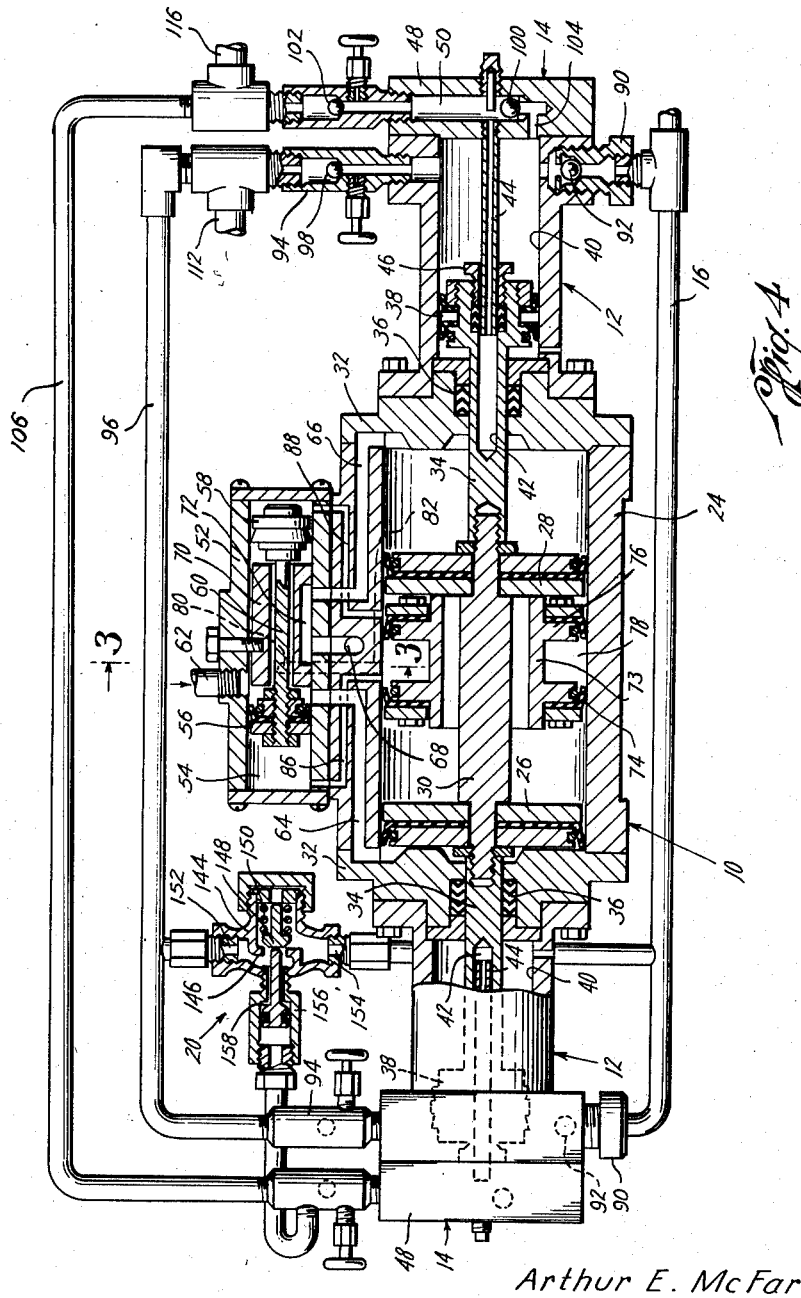

Figure 3 is a cross-sectional view, on an enlarged scale, taken along the line 3—3 of Figure 4, looking in the direction indicated by the arrows and showing the construction of the valve of the pressure fluid operated motor by which the pumping mechanism is operated; and Figure 4 is a side view, partly broken away and partly in cross-section, showing the details of construction of the high and low pressure pumping mechanism and the pressure fluid operated motor by which the same is operated.

Referring now to the drawings in greater detail, the invention comprises, briefly stated, a pressure fluid operated motor 10, of the reciprocating type, connected in driving relation to identical high and low pressure fluid pumps 12, 12, in a manner to operate both of said pumps upon one complete cycle of the operation of the motor, each of said pumps having suitable valve mechanism, indicated generally at 14, 14, and being connected in communication with a fluid supply line 16, and a fluid delivery line 18, and a by-pass valve 20, and a pressure control valve 22, whereby the flow of low and high pressure fluid delivered to the apparatus or device to be tested is automatically controlled.

The pressure fluid operated motor 10 has a cylinder 24, in which longitudinally spaced pistons 26 and 28 are movable disposed at the opposite ends of a connecting shaft 30. At its opposite ends the cylinder 24 is provided with suitable cylinder heads 32, 32, through which pump rods 34, 34, extend through central openings in the cylinder heads, suitable packing, such as that indicated at 36, 36, being provided on the cylinder heads surrounding the pump rods, to prevent leakage of pressure fluid from the interior of the cylinder. The pump rods 34, 34 are attached at their inner ends to the opposite ends of the shaft 30, to reciprocate therewith upon operation of the pressure fluid motor, and each of these pump rods carries at its outer end a low pressure pump piston 38, which works in a low pressure cylinder 40, connected to the respective cylinder head 32.

Each of the pump rods 34 has a counterbore 42, which opens outwardly at the outer end of the rod, and forms a high pressure cylinder within the outer end of which a tubular high pressure piston 44 extends, through a suitable packing gland 46, whereby the high pressure cylinder may reciprocate back and forth on the high pressure piston during the pumping operation. Each high pressure piston 44, is attached at its outer end to an outer cylinder head 48, on the respective low pressure cylinder 40, and within which there is a high pressure chamber 50, within the interior of which the high pressure piston communicates.

The valve mechanism by which the intake and exhaust of pressure fluid to and from the pressure fluid operated motor is controlled is enclosed in a housing 52 attached to the cylinder 24, and which has an internal cylindrical valve chamber 54 in which a double piston valve having spaced pistons 56 and 58 connected by a piston rod 60 is movably positioned. The valve housing 52 has an inlet opening to which an intake pipe 62 is connected which leads to any convenient source of operated pressure fluid. The housing 52 also has ports in communication with the chamber 54 and with passageways 64 and 66 leading to the opposite ends of the cylinder 24. An exhaust passageway 68 is also provided which communicates with the chamber 54 at a location between the passageways 64 and 66 and which leads to the atmosphere. The double piston valve has an exhaust valve body 70 carried on the piston rod 60 and which has an external recess 72 adapted to be brought into communication with the passageways 66 and 68 in one position of the valve to permit fluid to be exhausted to the atmosphere from one end of the cylinder 24, and which communicates with the passageways 64 and 68 in another position of the valve to allow fluid to be exhausted from the other end of the cylinder 24.

The pistons 56 and 58 are positioned somewhat beyond the opposite ends of the exhaust valve body 70, so that when the exhaust valve is in a position to permit exhaust of fluid through passageways 66 and 68 from one end of the cylinder, fluid from the intake pipe 62 may flow through passageway 64 to the opposite end of the cylinder 24, as seen in Figure 4. Similarly, when the exhaust valve 70 moves to a position to permit the exhaust of fluid through the passageways 64 and 68, the intake pipe will be in communication with the passageway 66.

Surrounding the shaft 30 between the pistons 26 and 28 in the cylinder 24 there is a spool valve 73 having pistons 74 and 76 at its opposite ends providing an annular recess 78, and a passageway 80 is formed in the housing 52, as best seen in dotted lines in Figure 3, which communicates with a passageway 82 in the cylinder 24 leading into the recess 78. The passageway 80 leads into the chamber 54 of the housing 52 and the exhaust valve 70 is cut away as indicated at 84, so that the passageway 80 is always in communication with the intake pipe 62.

From the interior of the cylinder 24 passageways 86 and 88 lead to the opposite ends of the chamber 54. The passageways 86 and 88 are positioned so that the passageway 88 is closed by the piston 28 when the passageway 86 is open and passageway 86 will be closed by piston 26 when the passageway is open.

In the operation of the pressure fluid motor the parts will be in the relative positions seen in Figure 4 when the pistons 26 and 28 are at one extreme position of their movement in the cylinder 10. In this position of the motor the piston 28 has just engaged the spool valve 73 to move this valve to cut off the passageway 88 and open the passageway to the inflow of fluid from the intake pipe 62 through passageways 80 and 82 to recess 78 and thence to the chamber 54 to act on piston 56 to move the exhaust valve body 70 to the position shown. Fluid from intake pipe 62 may now enter the cylinder 24 through passageway 64 to act on piston 26 to move the same toward the opposite end of the cylinder while fluid may exhaust from said opposite end through passageway 66, recess 72 and passageway 68. When piston 26 engages spool valve 73 it will move the spool valve with it toward the opposite end of cylinder 24 to close passageway 86 and open passageway 88, whereupon pressure fluid from intake pipe 62 will enter chamber 54 to act on piston 58 to move the exhaust valve 70 to establish communication between passageways 64 and 68 and permit fluid from the intake pipe to again enter through passageway 66 to act on piston 28 to move the same back to the position shown in Figure 4.

The motor may be operated in the manner described above to operate the pump pistons 38, 38 and 44, 44 at substantially constant speed.

Connected in communiction with each of the low pressure pump cylinders 40 there is an inlet check valve housing 90, with which the hydraulic fluid supply pipe 16 is also connected, and each valve housing has an internal valve seat and a ball valve 92 which engages the seat to close the valve against outflow of fluid from the cylinder 40. An outlet check valve housing 94 is similarly connected in communication with the interior of each low pressure pump cylinder 40 and with an outlet pipe 96, and has an internal valve seat for outwardly opening ball check valve 98. It will be apparent that with the valve arrangement as described movement of the pistons 38 in one direction in the cylinders 40 will cause hydraulic fluid to be drawn into one cylinder while being discharged from the other cylinder, and that this action will be reversed when the pistons move in the other direction, thus securing a pumping stroke in either direction of movement of the motor pistons.

Similar inlet and outlet check valves 100 and 102, respectively are provided connected in communication with each of the high pressure pump chambers 50, an inlet passageway 104, being provided in each of the heads 48 leading from the interior of the corresponding cylinder 40 to the inlet valve. The outlet valves 102 are connected in communication with an outlet pipe 106. By this arrangement hydraulic fluid will be drawn into one of the high pressure pump chambers 50 and discharged from the other high pressure chamber.

Figure 1:
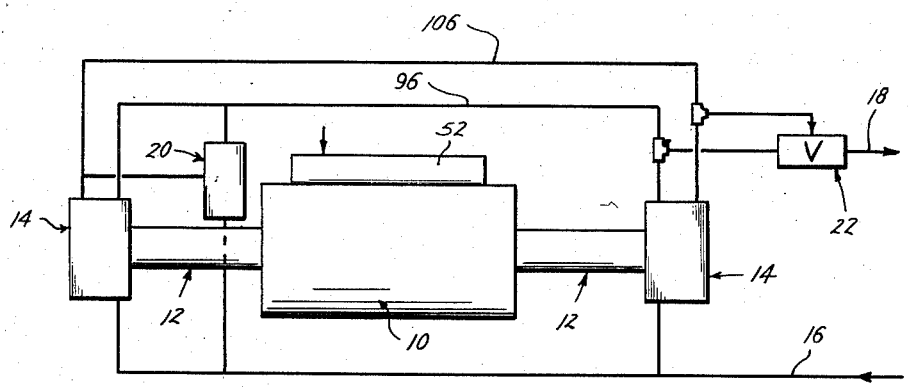
Figure 1 is a diagrammatic view of the invention, showing the arrangement of the various elements of the hydraulic testing equipment.
Figure 2:
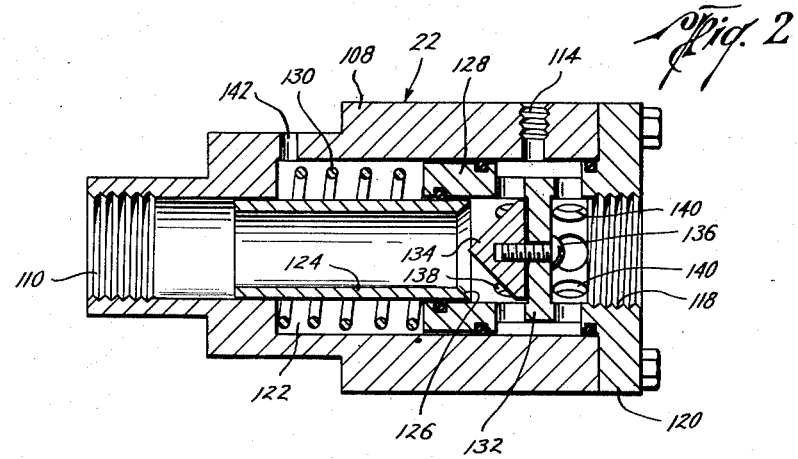
Figure 2 is a central, longitudinal, cross-sectional view on an enlarged scale of the valve which controls the delivery of high and low pressure fluid to the apparatus or device to be tested.

The structure of the pressure delivery control valve mechanism 22 is shown in detail in Figure 2, wherein the valve casing is indicated at 108 having a low pressure inlet 110 adapted to be connected in communication with the low pressure outlet pipe 96 through a branch pipe 112, shown in Figure 4, and a high pressure inlet 114 for connection in communication with the high pressure outlet pipe 106 through branch pipe 116. The valve casing 108 also has an outlet 118 formed in the housing end closure 120 for connection to the hydraulic fluid delivery pipe 18 leading to the apparatus or device to be tested. The pressure delivery control valve has an internal chamber 122, into which an internal sleeve 124 extends, which sleeve is attached at is outer end to the interior of the casing within the inlet 110 and has at its inner end a tapered valve seat 126 spaced inwardly of the closure 120. A tubular piston 128 is movably disposed in the casing extending between the sleeve 124 and the interior of the casing. A coil spring 130 is positioned around the sleeve 124 and bearing at one end against the piston 128 and at the other end against the casing at one end of the chamber 122 to yieldingly urge the piston toward the closure 120. The piston 128 is provided with an internal web 132, to which a tapered valve element 134 is attached by suitable means, such as a screw 136 extending through a central opening in the web, in position to seat on the seat 126 when the piston 128 moves toward the inlet 110. The piston 128 also has openings 138 and 140 disposed on opposite sides of the web 132 through which low pressure fluid may flow from the inlet 110 through the sleeve 128 and out of the outlet 118 when the valve 134 is in open position. High pressure fluid may also flow from the inlet 114 through the openings 140 to the outlet 118. The valve casing 108 has an opening 142 through which air may pass into and out of the portion of the chamber 122 in which the spring 130 is located.

The equipment also includes the by-pass valve 20, which comprises a valve casing 144 having an internal valve seat 146 and a valve 148 which is urged into closing contact with the seat by a coil spring 150. The casing 144 has an inlet 152 connected in communication with the outlet pipe 96 and an outlet 154 connected in communication with the supply pipe 16, whereby fluid may pass from the outlet pipe 96 back to the supply pipe 16 when the valve 148 is open. The by-pass valve mechanism also includes a cylinder 156 connected at one end in communication with high pressure outlet pipe 106 and within which a plunger 158 is movable which plunger extends beyond the opposite end of the cylinder and into the valve casing 144 to engage the valve 148 and move the valve to open position against the pressure of the spring 150. The spring 150 may be of sufficient strength to maintain the valve 148 closed during the pumping of hydraulic fluid from the low pressure cylinders 40, and until the pressure in the high pressure outlet pipe 106 exceeds a predetermined limit, whereupon the plunger 158 will be actuated to open the valve 148 and permit the low pressure fluid to pass from the low pressure outlet pipe 96 back to the supply pipe 16, thus inactivating the low pressure pumping mechanism.

In the operation of the equipment, the fluid motor 10 is operated by the application of pressure fluid thereto through the intake 62, to actuate the low pressure pistons 38 and high pressure pistons 44. Hydraulic fluid is thus drawn into the low pressure cylinders 40 and pumped therefrom into the low pressure outlet pipe 96 from whence it flows through the pipe 112 to the pressure delivery control valve 22 and through pipe 18 to the apparatus or device to be tested. During the pumping of the fluid at low pressure the valve 134 will be open and fluid may also be pumped from the high pressure chamber 50 through high pressure outlet pipe 106 to the inlet 114 of valve mechanism 22 from whence it flows to the apparatus or device being tested.

When the apparatus or device being tested has been filled or nearly filled with hydraulic fluid the pressure in the delivery line will be suddenly increased, so that the pressure of fluid in the low pressure outlet pipe 96 will be insufficient to cause further flow of fluid through the pressure delivery control valve, whereupon high pressure fluid from the high pressure outlet pipe will enter the inlet 114 to further increase the pressure in the delivery pipe 18 causing the valve 134 to close against the pressure of the spring 130 on the piston 128. The high pressure of fluid in the outlet pipe 106 will also cause the plunger 158 to open the by-pass valve 148 whereby fluid from the outlet pipe 96 may return to supply pipe 16, thus permitting the pistons 38 to move without resistance during the high pressure pumping operation.

It will thus be seen that the invention constructed and operated in the manner described above provides hydraulic testing apparatus by which the apparatus or device to be tested may be quickly filled with hydraulic testing fluid and thereafter subjected to a high testing pressure.

While the invention has been disclosed herein in connection with a certain specific embodiment of the same, it will be understood that this is intended by way of illustration only, and that numerous modifications can be made in the construction and arrangement of the various parts without departing from the spirit of the invention or the scope of the appended claims.

Having thus clearly shown and described the invention, what is claimed as new and desired to secure by Letters Patent is:

1. In hydraulic testing equipment having high and low fluid pressure pumps, valve means for controlling the delivery of pressure fluid from said pumps comprising a valve casing having an internal chamber and a low pressure inlet, means in the casing forming a valve seat in said chamber in communication with said low pressure inlet, said casing having a high pressure inlet and a fluid delivery outlet in communication with the chamber and with said low pressure inlet through said seat, a tubular element slidably mounted in said chamber in surrounding relation to the seat, and a valve carried by said element for movement therewith into and out of engagement with said seat to close and open said seat, and yieldable means in the chamber in position to coact with said casing and element to yieldingly urge the element in a direction to move the valve away from the seat, said valve being movable with said element under the influence of the pressure of fluid in said delivery outlet to close said seat when said pressure exceeds a predetermined limit.

2. In hydraulic testing equipment having high and low fluid pressure pumps, valve means for controlling the delivery of pressure fluid from said pumps comprising a valve casing having an internal chamber and a low pressure inlet, a sleeve in said chamber in communication at one end with said low pressure inlet and whose other end is formed to provide a valve seat, said casing having a fluid delivery outlet in communication with the chamber and with said low pressure inlet through said seat, a tubular element surrounding and slidably movable on said sleeve in said chamber, yieldable means in the chamber at one side of said element in position to coact with said casing and element to yieldingly urge the element in one direction of said sleeve, said casing having a high pressure inlet leading into said chamber at a point beyond the other side of said element, and means on said element positioned to engage said seat to close the seat upon movement of said element in the other direction on said sleeve.

3. In hydraulic testing equipment having high and low fluid pressure pumps, valve means for controlling the delivery of pressure fluid from said pumps comprising a valve casing having an internal chamber and a low pressure inlet, a sleeve in said chamber in communication at one end with said low pressure inlet and whose other end is formed to provide a valve seat, a fluid delivery outlet in communication with the chamber and with said low pressure inlet through said seat, a tubular element surrounding and slidably movable on said sleeve in said chamber seal forming means between said sleeve and element and between said element and said casing, yieldable means in the chamber at one side of said element in position to yieldingly urge the element in one direction on said sleeve, said casing having a high pressure inlet leading into said chamber at a point beyond the other side of said element, and means on said element positioned to engage said seat to close the seat upon movement of said element in the other direction on said sleeve, said element benig exposed at one end to the pressure of fluid in said outlet, and said casing having a pressure relief port in communication with said chamber beyond the other end of said element.

References Cited in the file of this patent

UNITED STATES PATENTS

| | | |
|---|---|---|
| 1,770,297 | Bussmann | July 8, 1930 |
| 2,135,721 | Landenberger | Nov. 8, 1938 |
| 2,218,565 | Vickers | Oct. 22, 1940 |
| 2,357,029 | Smith | Aug. 29, 1944 |
| 2,512,025 | Lauck | June 20, 1950 |
| 2,621,675 | Potts | Dec. 16, 1952 |
| 2,633,739 | Potts et al. | Apr. 7, 1953 |
| 2,643,612 | Coberly | June 30, 1953 |

FOREIGN PATENTS

| | | |
|---|---|---|
| 703,569 | France | May 2, 1931 |